(12) United States Patent
Johnson et al.

(10) Patent No.: US 7,416,479 B2
(45) Date of Patent: Aug. 26, 2008

(54) HIGH CAPACITY FOOD PROCESSING SYSTEM

(75) Inventors: Noel R. Johnson, Stoughton, WI (US); Luke A. Titel, Sun Prairie, WI (US); Nicholas Cable, Lodi, WI (US); Wendell J. Holl, Lodi, WI (US); Donald J. Endres, Waunakee, WI (US); David Nordby, Verona, WI (US); Andi J. Mikelsons, Middleton, WI (US)

(73) Assignee: Alkar-RapidPak, Inc., Lodi, WI (US)

( * ) Notice: Subject to any disclaimer, the term of this patent is extended or adjusted under 35 U.S.C. 154(b) by 247 days.

(21) Appl. No.: 11/488,549

(22) Filed: Jul. 18, 2006

(65) Prior Publication Data

US 2007/0032183 A1   Feb. 8, 2007

Related U.S. Application Data

(62) Division of application No. 10/683,854, filed on Oct. 10, 2003, now Pat. No. 7,083,509.

(51) Int. Cl.
   *A22C 11/00* (2006.01)

(52) U.S. Cl. .......................................................... 452/51

(58) Field of Classification Search ............. 452/30–35, 452/37, 46, 51; 198/461.1, 459.8, 460.1, 198/463
See application file for complete search history.

(56) References Cited

U.S. PATENT DOCUMENTS 3,964,129 A    6/1976 Townsend
4,880,105 A    11/1989 Kasai et al.
6,056,636 A *  5/2000  Cody et al. .................. 452/51
6,086,469 A    7/2000  Cody et al.
6,253,906 B1   7/2001  Hall
6,277,018 B1   8/2001  Cody et al.
6,460,683 B1   10/2002 Pfeiffer
6,523,462 B1   2/2003  Johnson et al.
6,540,063 B1   4/2003  Fallas et al.
6,751,524 B2   6/2004  Neary et al.
6,830,145 B2   12/2004 Flom
6,918,484 B2   7/2005  Affaticati et al.
7,083,509 B2 * 8/2006  Johnson et al. ............... 452/30

FOREIGN PATENT DOCUMENTS

DE            44 10 391        9/1995

* cited by examiner

*Primary Examiner*—Thomas Price
(74) *Attorney, Agent, or Firm*—Andrus, Sceales, Starke & Sawall, LLP (57) ABSTRACT

A high capacity food processing system, including for an elongated strand of food product such as hot dogs, sausage links, etc., has first and second loading stations with serial accumulators enabling intermittent stopping of the loading operation, which is a necessary and normal part of use, without disrupting a downstream thermal process, and enabling differential conveyor velocities through the loading stations, including a loading velocity for loading food product on the conveyor, a bypass velocity during intermittent non-loaded conveyor segments, and a transport velocity through the processing station, wherein the transport velocity is less than the bypass velocity and greater than the loading velocity, and where the transport velocity remains constant and the same during both of the loading and bypass velocities of the conveyor at the loading stations and also remains constant and the same during stopped movement of the conveyor at the loading stations.

24 Claims, 7 Drawing Sheets

HIGH CAPACITY FOOD PROCESSING SYSTEM

CROSS REFERENCE TO RELATED APPLICATION

This application is a division of U.S. patent application Ser. No. 10/683,854, filed Oct. 10, 2003, now U.S. Pat. No. 7,083,509.

BACKGROUND OF THE INVENTION

The invention relates to food processing systems for processing a food product including an elongated strand of food product in a casing having tubular segments serially joined by pinched connection segments, e.g. hot dogs, sausage links, etc.

The invention arose during continuing development efforts directed toward subject matter such as shown in U.S. Pat. Nos. 6,056,636, 6,086,469, and 6,523,462, all incorporated herein by reference. In such systems, strands of sausage are made on high speed machines by extruding meat emulsion into an elongated casing. The meat-filled casing is then twisted to create sausage links. The link strand is then discharged from the sausage making machine. Loops of sausage comprising a plurality of links are deposited on moving hooks of a conveyor chain. The ultimate length of a given strand is determined by the length of the casing being filled. When a casing has been filled, the sausage making machine is stopped; the casing is tied off or closed to prevent any meat emulsion from exiting the rearmost end of the casing; a new casing is then placed in position to be filled; the machine is re-started and the cycle repeats itself. The linked and looped sausage strand or strands are periodically removed from the conveyor chain or otherwise transported to a food processing station which cooks, smokes, chills and/or otherwise treats the sausage strand before packaging for final delivery to the consumer. Any inefficiency in the process translates into increased cost of production which is reflected in the price of the products to the consumer.

The present invention is directed to improvements in the above noted system including providing higher capacity and other manufacturing efficiencies.

The above noted system is accomplished with a single sausage casing stuffing and linking machine and loading station for the conveyor. A first significant function of the loading apparatus is to properly present the sequence of conveyor chain hooks to the stuffing/linking machine so as to produce a stuffed and linked casing of finite length which is consistently and uniformly draped over the series of hooks, for example, as set forth in noted incorporated U.S. Pat. 6,523,462. A second significant function of the loading apparatus is to allow for constant velocity movement of the conveyor chain from the loading apparatus through the thermal processing portion of the system while permitting intermittent stopping of the conveyor chain at the stuffing/linking device at the loading station, for example as set forth in incorporated U.S. Pat. No. 6,086,469.

In one aspect of the present invention, both of the above noted functions of the loading apparatus are preserved, while incorporating a second sausage stuffing/linking machine and a second loading station. The addition of a second stuffing/linking machine increases the conveyor processing system production capacity. The conveyor travels at a higher speed proportional to the increased production rate. The present system allows for non-synchronized intermittent and differential conveyor chain velocity at the two stuffing/linking devices.

In one embodiment, the system provides first and second loading stations, and first and second buffers receiving the outputs of the first and second loading stations, respectively. The first buffer includes first and second, input and output, conveyor chain accumulators, and the second buffer includes third and fourth, input and output, conveyor chain accumulators. The exit of the third accumulator from the second buffer is not routed to the second loading station, but rather to the first accumulator of the first buffer. The conveyor chain travels serially from the thermal processing station to the third accumulator of the second buffer then to the first accumulator of the first buffer then to the first loading station then to the second accumulator of the first buffer then to the second loading station then to the fourth accumulator of the second buffer then returns to the thermal processing station. A first segment of the chain is loaded with food product at the first loading station, and then a second trailing segment of the chain is indexed past the first loading station at a high rate of speed without product loading. The second loading station loads the empty segments of the conveyor chain not loaded by the first loading station, and then advances the chain at a higher velocity past the segments already containing food product loaded from the first station. The accumulators allow for independent starting, stopping and differential chain velocities at the loading stations, while maintaining constant and uninterrupted chain velocity through the thermal processing station. Periodically stopping the stuffing/linking device at the loading station is a necessary and normal part of its use. Increased food product capacity per conveyor chain length is achieved because two stuffer/linker machines are simultaneously loading on a single conveyor chain. To enable higher speed indexing and advancement of the chain, the loading stations are equipped with retractable lift cams which lift the hooks to an upwardly pivoted position for food product loading, and which retract to allow the hooks to remain in a downwardly depending non-cammed position to facilitate faster movement through the loading station during high speed indexing of the chain.

In another embodiment, the accumulators of the first buffer are synchronized with the accumulators of the second buffer to allow loading from only one of the loading stations, where less capacity is needed, or where a single stuffing/linking machine can keep up the production rate for the particular product in the current run, or where one of the stuffing/linking machines is shut down for maintenance or the like. In the preferred embodiment, with both stuffing/lining machines operating, the production rate is greater than that of a single loader system.

DETAILED DESCRIPTION

Figure 1:
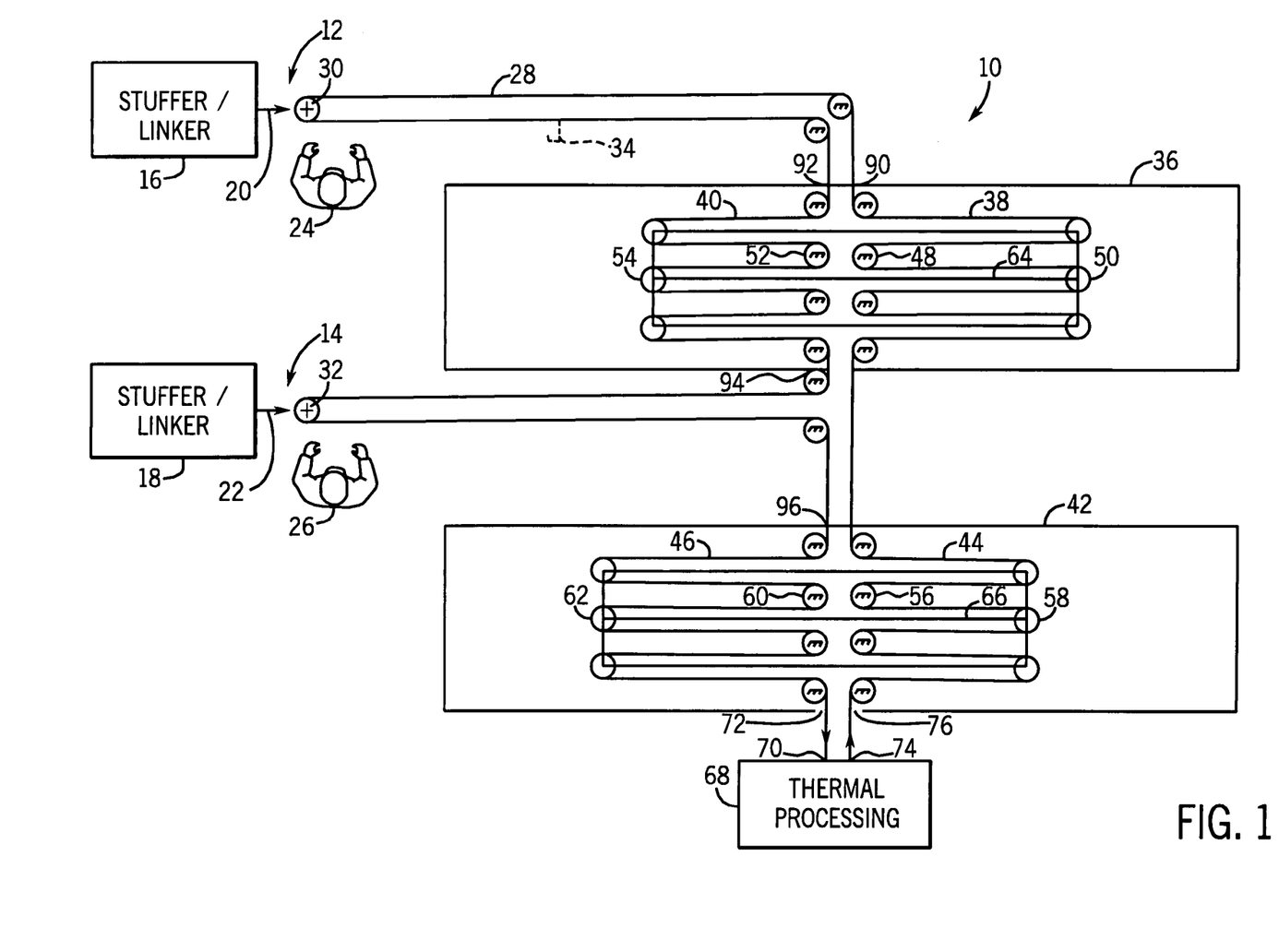
FIG. 1 is a schematic plan view of a processing system in accordance with the invention.

FIG. 1 shows a high capacity processing system 10 for processing a food product, and includes first and second loading stations 12 and 14, each of which is like that shown in incorporated U.S. Pat. No. 6,086,469, including a sausage making machine provided by a stuffer/linker 16, 18, respectively, each producing an elongated strand of food product in a casing having tubular segments serially joined by pinched connection segments, for example as shown in FIG. 1 of incorporated U.S. Pat. No. 6,523,462, and FIG. 11 of incorporated U.S. Pat. No. 6,086,469. First and second strand loading stations 12 and 14 are adjacent respective first and second discharge exits 20 and 22 of respective first and second strand producing machines 16 and 18. The loading stations may be monitored by operators such as shown at 24, 26. A conveyor 28 provided by the chain shown in the noted incorporated '462 and '469 patents traverses around first and second sprockets 30 and 32 at respective first and second strand loading stations 12 and 14. A plurality of J-shaped hooks, schematically shown at 34 in FIG. 1 and shown in FIGS. 2-7 herein, and shown in the noted incorporated '462 and '469 patents, are mounted to chain 28 for receiving the strand of food product at a respective stranding loading station, all as set forth in the incorporated '462 and '469 patents. The chain traverses serially through the first and second strand loading stations 12 and 14.

A first buffer 36 has first and second accumulators 38 and 40, and is like that set forth in the incorporated '469 patent as shown in FIG. 3 therein. A second buffer 42 has third and fourth accumulators 44 and 46 and is also like that shown in the incorporated '469 patent. First and second buffers 36 and 42 are arranged such that chain 28 traverses serially through third accumulator 44 then through first accumulator 38 then around first sprocket 30 through first strand loading station 12 then through second accumulator 40 then around second sprocket 32 through second strand loading station 14 then through fourth accumulator 46. Each of the accumulators has an inlet and an outlet and enables differential chain velocity at its respective inlet and outlet, as is known.

First accumulator 38 has a first set of fixed sprockets 48, and a first set of moveable sprockets 50 moveable toward and away from the first set of fixed sprockets 48. In the orientation of FIG. 1, moveable sprockets 50 are moveable left and right, toward and away, respectively, from fixed sprockets 48. For further reference, attention is directed to chain take-up assembly 20 in FIGS. 1-3 of the incorporated '469 patent. Second accumulator 40 includes a second set of fixed sprockets 52, and a second set of moveable sprockets 54 moveable toward and away from the second set of fixed sprockets 52. In the orientation of FIG. 1, moveable sprockets 54 move rightwardly toward fixed sprockets 52, and leftwardly away from fixed sprockets 52. Third accumulator 44 includes a third set of fixed sprockets 56, and a third set of moveable sprockets 58 moveable toward and away from the third set of fixed sprockets 56. In the orientation of FIG. 1, moveable sprockets 58 move leftwardly toward fixed sprockets 56, and move rightwardly away from fixed sprockets 56. Fourth accumulator 46 includes a fourth set of fixed sprockets 60, and a fourth set of moveable sprockets 62 moveable toward and away from the fourth set of fixed sprockets 60. In the orientation of FIG. 1, moveable sprockets 62 move rightwardly toward fixed sprockets 60, and move leftwardly away from fixed sprockets 60. The first and second sets of moveable sprockets 50 and 54 are linked by a common rigid subframe member 64, as in the incorporated '469 patent, and move in unison such that the first set of moveable sprockets 50 move rightwardly away from the first set of fixed sprockets 48 when the second set of moveable sprockets 54 move rightwardly toward the second set of fixed sprockets 52. Likewise, the first set of moveable sprockets 50 move leftwardly toward the first set of fixed sprockets 48 when the second set of moveable sprockets 54 move leftwardly away from the second set of fixed sprockets 52. The third and fourth sets of moveable sprockets 58 and 62 are linked by a common rigid subframe member 66 and move in unison such that the third set of moveable sprockets 58 move rightwardly away from the third set of fixed sprockets 56 when the fourth set of moveable sprockets 62 move rightwardly toward the fourth set of fixed sprockets 60, and likewise the third set of moveable sprockets 58 move leftwardly toward the third set of fixed sprockets 56 when the fourth set of moveable sprockets 62 move leftwardly away from the fourth set of fixed sprockets 60.

First buffer 36 has first and second buffer modes. First and second accumulators 38 and 40 move in unison in the first buffer mode, with the first set of moveable sprockets 50 moving rightwardly away from the first set of fixed sprockets 48 and taking-up chain, and the second set of moveable sprockets 54 moving rightwardly toward the second set of fixed sprockets 52 and paying-out chain, as in the incorporated '469 patent. First and second accumulators 38 and 40 move in unison in the noted second buffer mode, with the first set of moveable sprockets 50 moving leftwardly toward the first set of fixed sprockets 48 and paying-out chain, and the second set of moveable sprockets 54 moving leftwardly away from the second set of fixed sprockets 52 and taking-up chain, as in the incorporated '469 patent. Second buffer 42 has third and fourth buffer modes. Third and fourth accumulators 44 and 46 move in unison in the third buffer mode, with the third set of moveable sprockets 58 moving rightwardly away from the third set of fixed sprockets 56 and taking-up chain, and the fourth set of moveable sprockets 62 moving rightwardly toward the fourth set of fixed sprockets 60 and paying-out chain. Third and fourth accumulators 44 and 46 move in unison in the noted fourth buffer mode, with the third set of moveable sprockets 58 moving leftwardly toward the third set of fixed sprockets 56 and paying-out chain, and the fourth set of moveable sprockets 62 moving leftwardly away from the fourth set of fixed sprockets 60 and taking-up chain.

A thermal processing station or system 68 has an inlet 70 receiving chain 28 from outlet 72 of fourth accumulator 46, and has an outlet 74 returning the chain to inlet 76 of third accumulator 44. Processing station 68 may include one or more processing functions or stations such as cooking, smoking, chilling, etc., as in the incorporated '469 patent, and includes an unloading station as at 18 in the incorporated '469 patent for returning unloaded chain to inlet 76 of accumulator 44. System 10 has a loading-down-time accumulation mode wherein at least one of the first and third accumulators 38 and 44 take-up chain and at least one of second and fourth accumulators 40 and 46 pays-out chain such that chain movement to inlet 70 of processing station 68 and from outlet 74 of processing station 76 continues, while chain movement at at least one of the loading stations 12 and 14 is stopped.

The noted first through fourth accumulators, including the noted second accumulator 40 in series between first and second strand loading stations 12 and 14, enable first and second chain velocities through each of the first and second strand loading stations. The first chain velocity provides a loading chain velocity during which food product is loaded on the chain. The second chain velocity provides a bypass chain velocity during which food product is not loaded on the chain. The bypass velocity is greater than the loading velocity. System 10 has a first mode wherein food product is loaded on the chain at the first strand loading station 12 while the chain is moving at the noted loading chain velocity, to provide a first segment of chain 28 loaded with food product, and when the first segment reaches the second strand loading station 14, the chain is advanced through second loading station 14 at the noted bypass chain velocity without food product loading by second loading station 14. System 10 has a second mode wherein the chain is advanced through first loading station 12 at the noted bypass chain velocity without food product loading by first loading station 12, to provide a second empty segment of chain unloaded with food product and in series with the noted first segment of chain. When the noted second segment of chain reaches second loading station 14 the chain is advanced through second loading station 14 at the noted loading chain velocity with food product loading by second loading station 14. As chain 28 leaves first loading station 12, it has a plurality of intermittent segments comprising a first set of segments comprising the noted first segments loaded with food product and a second set of empty segments comprising the noted second segments unloaded with food product. The second segments are spaced by respective first segments therebetween. As the chain leaves second strand loading station 14, it has the noted second segments loaded with food product, in addition to the noted first segments loaded with food product. The chain has a transport chain velocity at outlet 72 of fourth accumulator 46 and at inlet 70 of processing station 68 and at outlet 74 of processing station 68 and at inlet 76 of third accumulator 44. The noted transport chain velocity remains constant and the same during each of the noted first and second modes of system 10, including the noted loading and bypass chain velocities, and also remains constant and the same during the noted stopped chain movement at either or both of the loading stations 12 and 14. The transport chain velocity is less than the bypass chain velocity and greater than the loading chain velocity.

Figure 2:
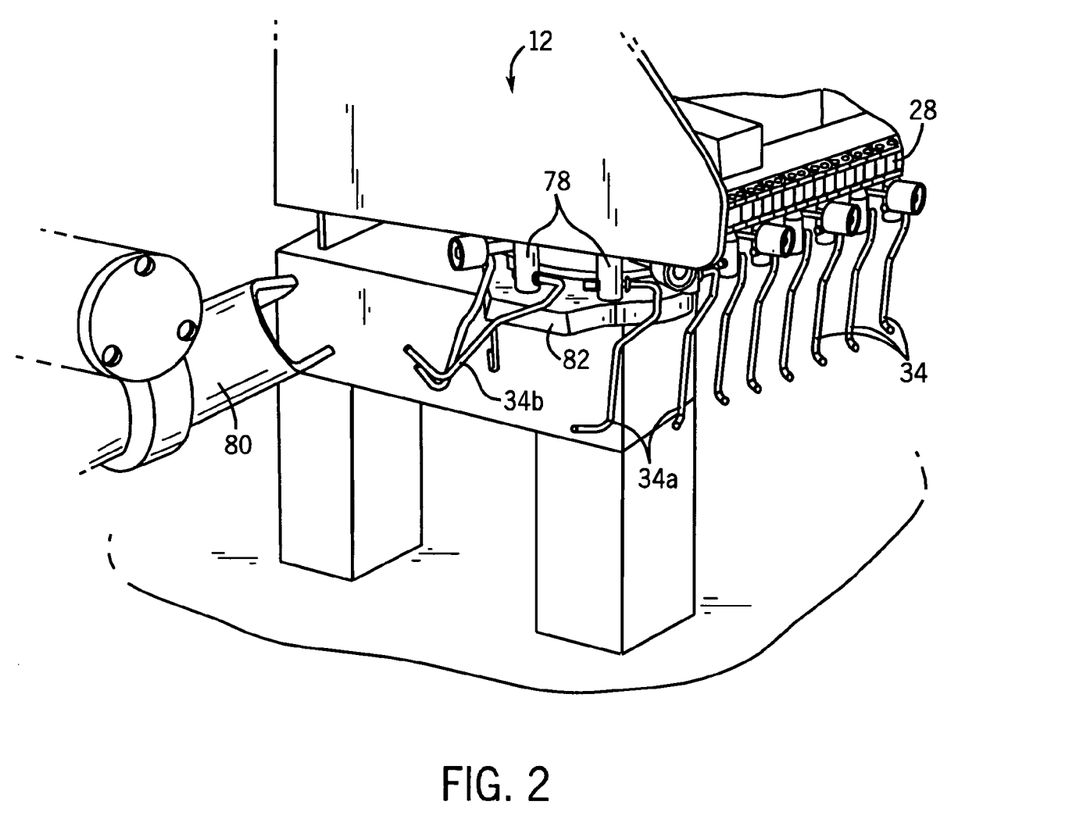
FIG. 2 is a perspective view of a loading station showing a conveyor chain hook in a cammed upwardly pivoted loading position.
Figure 3:
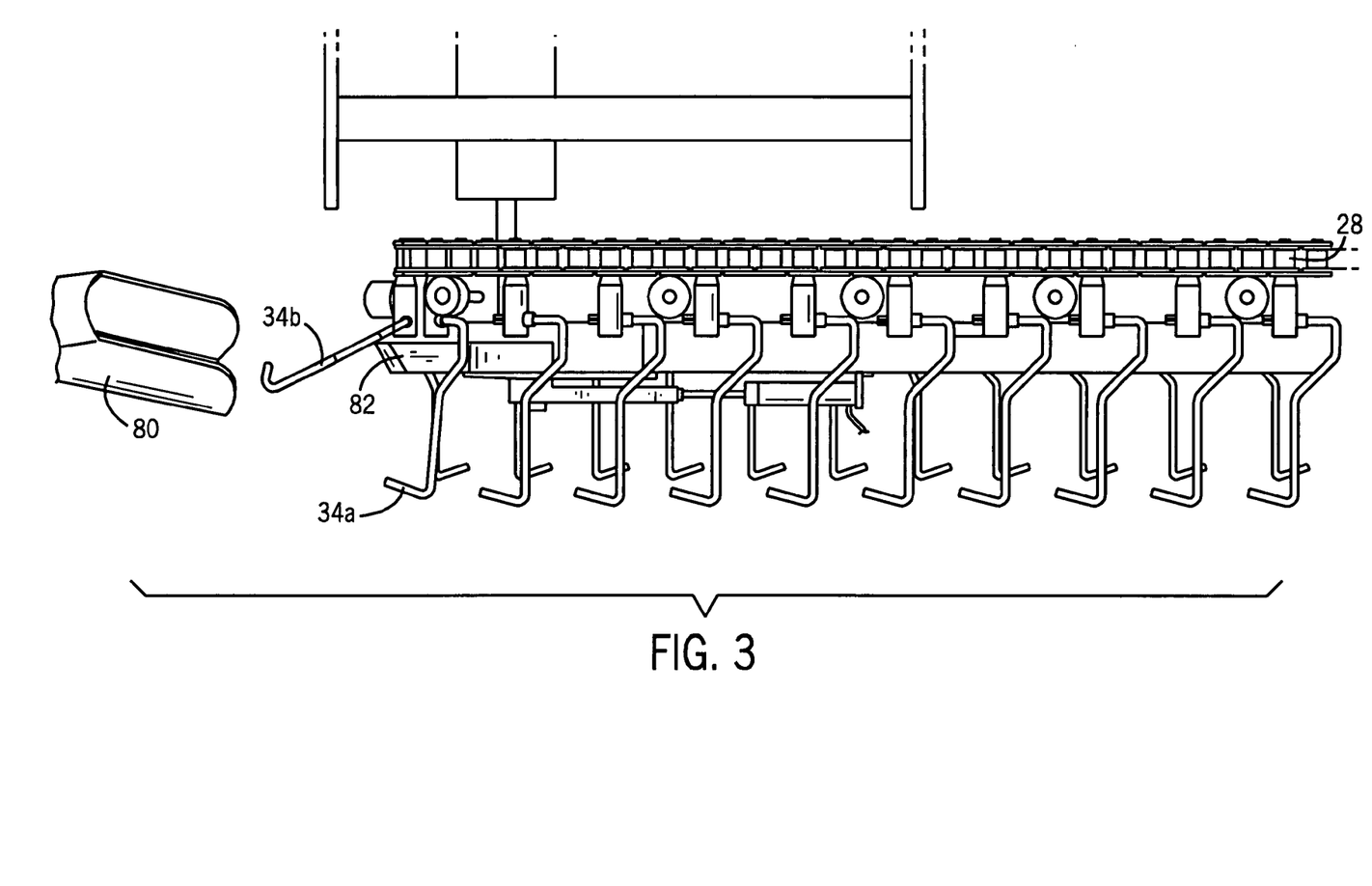
FIG. 3 is a side view of the loading station of FIG. 2.
Figure 4:
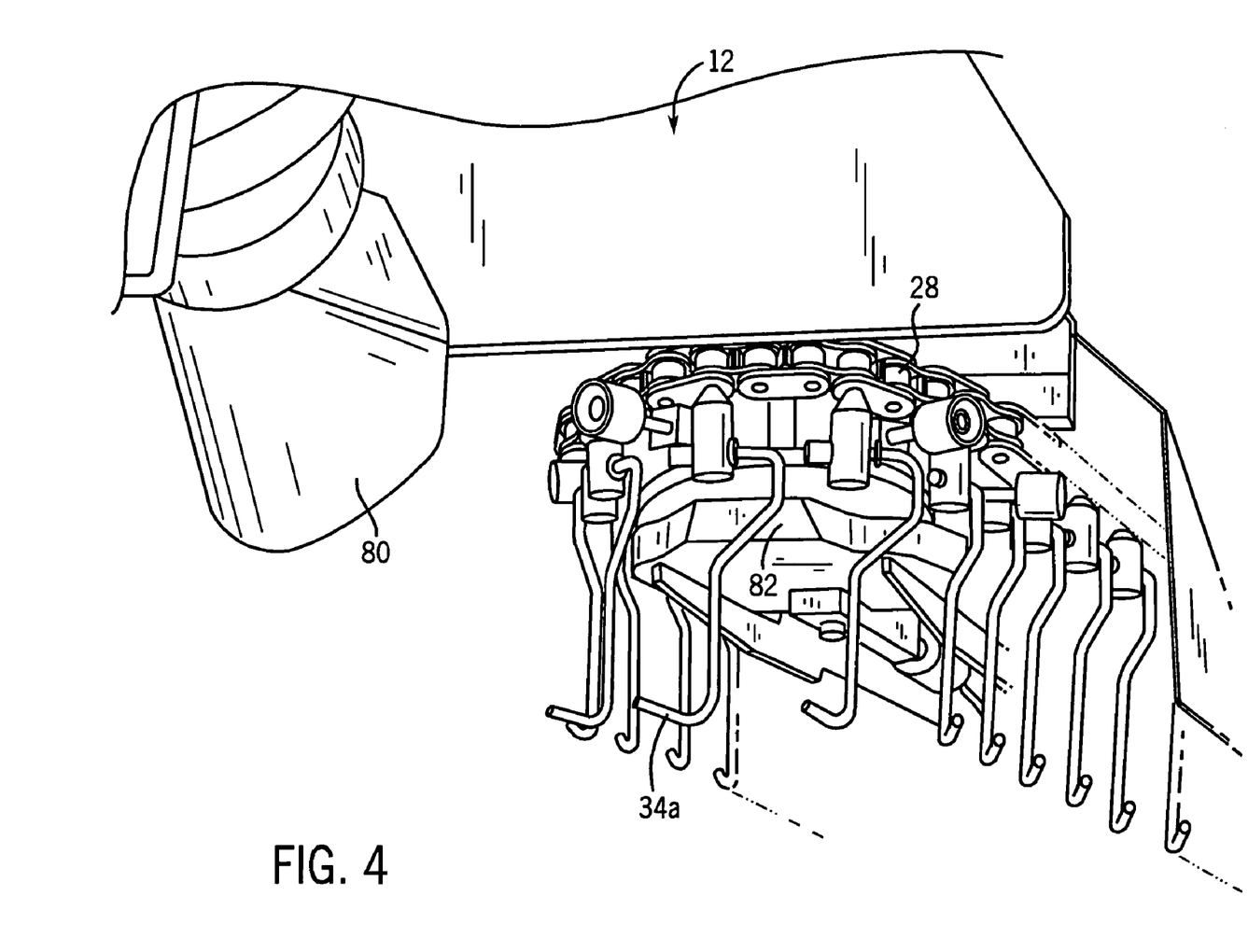
FIG. 4 is a perspective view of a loading station showing a conveyor chain hook in a non-cammed non-loading position.
Figure 5:
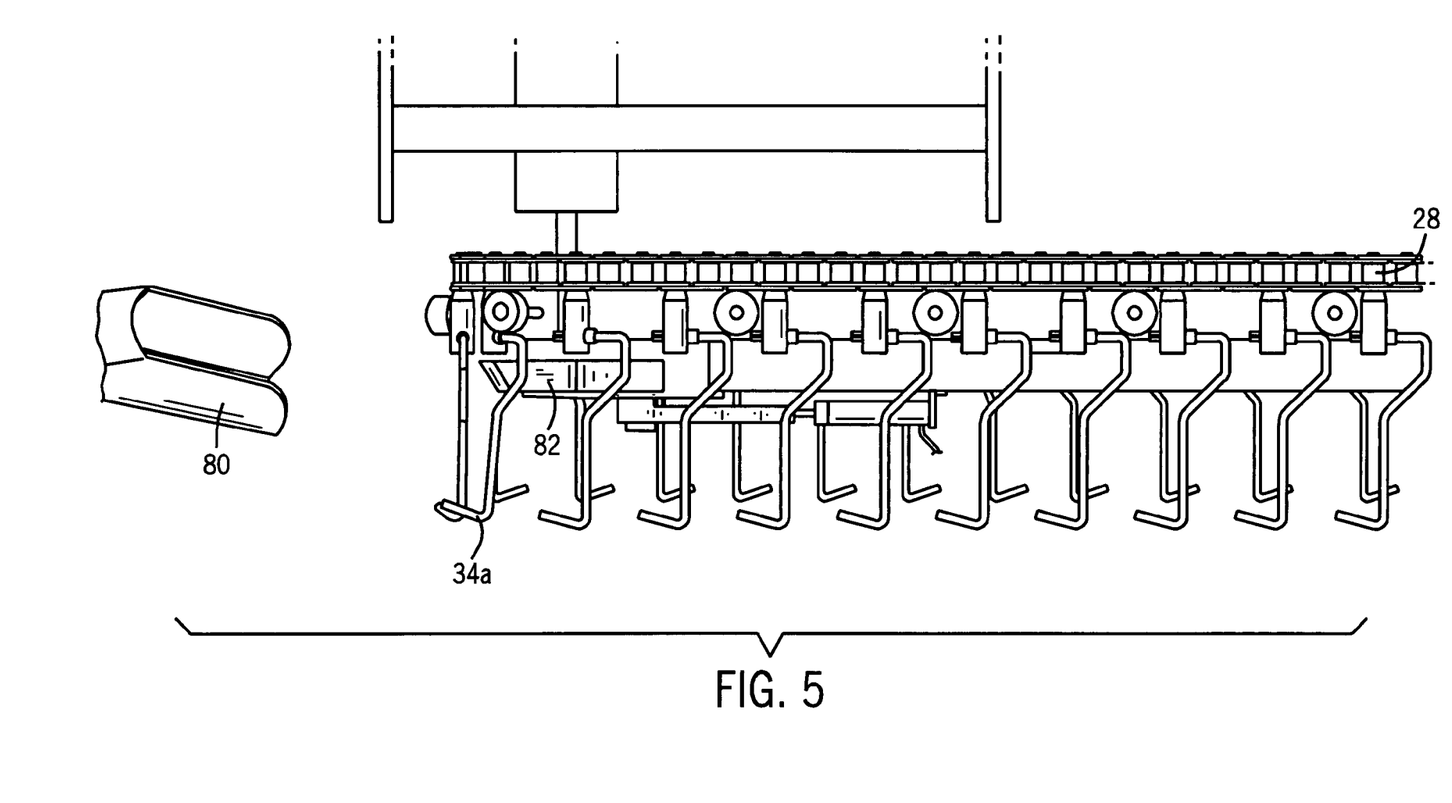
FIG. 5 is a side view like FIG. 3 but shows the conveyor chain hook in the downwardly depending non-cammed non-loading position.
Figure 6:
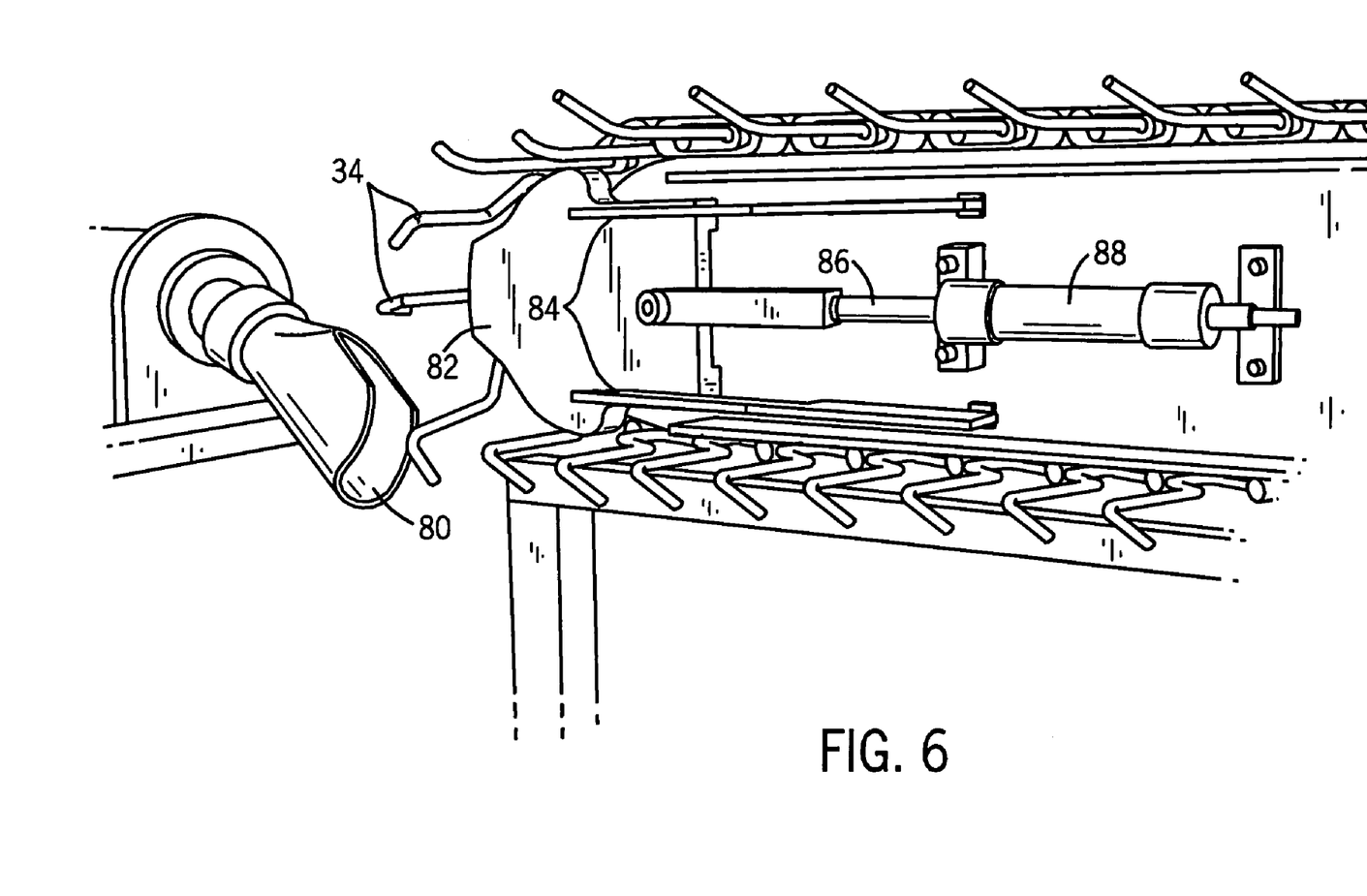
FIG. 6 is a perspective view from below showing the lift cam in an extended position for camming the conveyor chain hooks to an upwardly pivoted loading position as shown in FIGS. 2 and 3.
Figure 7:
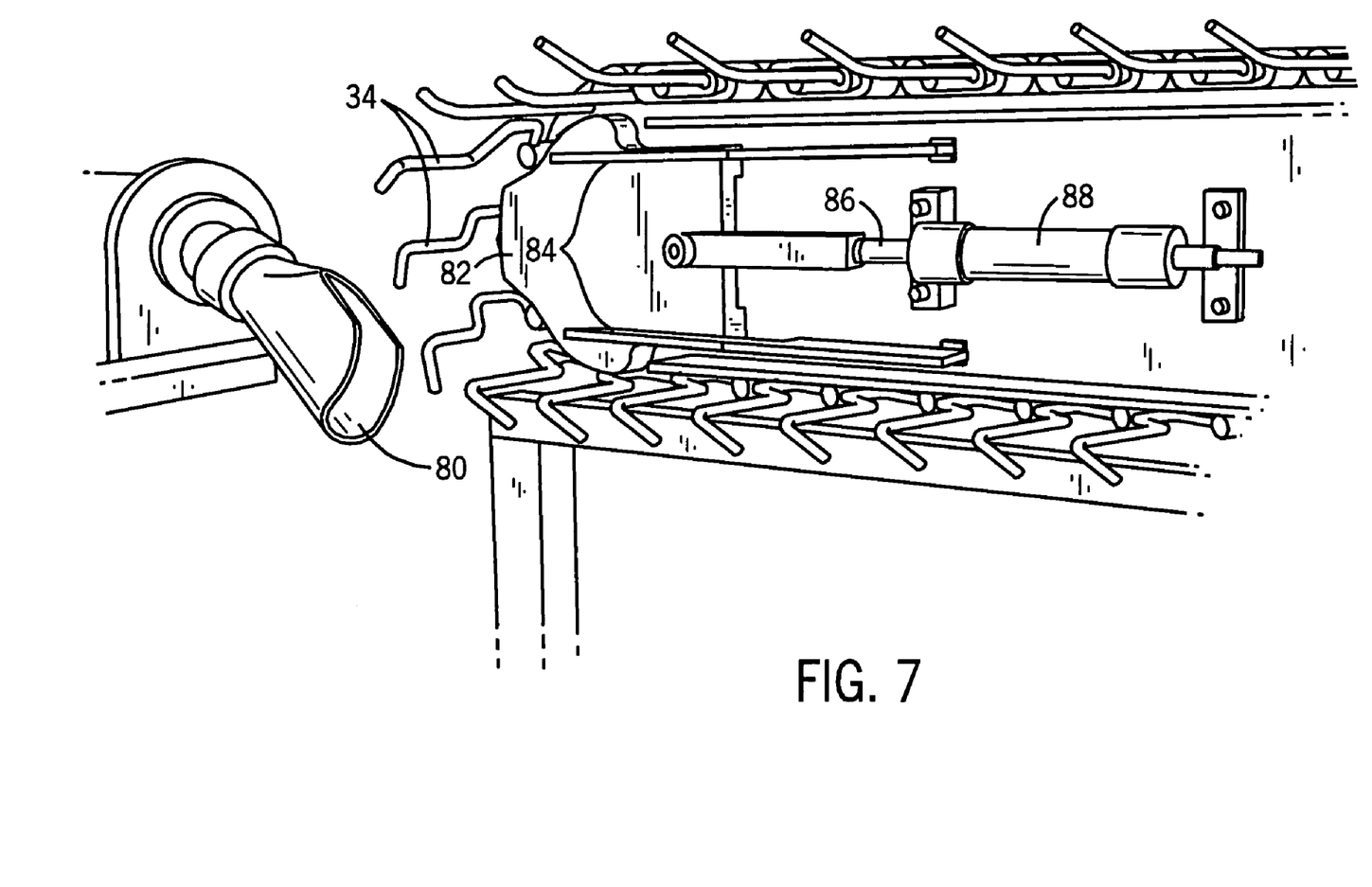
FIG. 7 is like FIG. 6 but shows the cam in the retracted position to allow the conveyor chain hooks to remain in the downwardly depending non-cammed non-loading position of FIGS. 4 and 5.

Chain 28 traverses in a horizontal plane around each respective sprocket 30 and 32 at each respective loading station 12 and 14. The noted plurality of hooks 34 are pivotally mounted to chain 28 by respective studs 78, FIG. 2, as in the incorporated '462 patent at hooks 72 pivotally mounted to chain 42 at studs 64 and traversing around sprocket 44. Each hook has a first orientation 34a depending downwardly from the chain, and a second upwardly pivoted orientation 34b for loading food product thereon from rotating discharge loop or horn 80 of the stuffer/linker strand producing machine, as in the incorporated '462 patent. System 10 has a loading mode at the loading station loading food product onto hooks 34. The system has a bypass mode leaving hooks 34 empty at the loading station without loading food product thereon. Chain 28 moves at the noted loading chain velocity during the loading mode, and at the noted bypass chain velocity during the bypass mode. As previously noted, the bypass chain velocity is greater than the loading chain velocity. A retractable cam 82 is provided at each loading station and is extendable and retractable between an extended loading position as shown in FIGS. 2, 3, 6, and a retracted bypass position as shown in FIGS. 4, 5, 7. Retractable cam 82 is like cam 80 in the incorporated '462 patent, except that cam 82 is extendable and retractable between the noted extended loading position and the retracted bypass position, respectively. Cam 82 in the noted extended loading position cams hooks 34, FIGS. 2, 3 from the noted first orientation 34a to the noted second orientation 34b, comparably to the camming of hooks 72 in the incorporated '462 patent. Cam 82 in the retracted bypass position, FIGS. 4,5, leaves hooks 34 in the noted first orientation 34a, i.e. depending downwardly and non-cammed, to allow the hooks to move through the loading station around the respective sprocket 30, 32 without being cammed to the noted second orientation 34b (upwardly pivoted), to permit the hooks to move through the loading station in the noted first orientation 34a at the noted bypass chain velocity. Cam 82 is horizontally moveable along a track 84, FIGS. 6, 7, beneath the respective sprocket 30, 32. In one embodiment, cam 82 is mounted to an extensible and retractable plunger 86 of a cylinder or solenoid 88 to move between the noted extended position, FIG. 6, and the noted retracted position, FIG. 7.

As noted above, conveyor chain 28 traverses serially through first and second loading stations 12 and 14. In one loading-down-time accumulation mode, accumulator 38 takes-up the conveyor, and accumulator 40 pays-out the conveyor, and conveyor movement is stopped at first loading station 12 and at outlet 90 of accumulator 38 and at inlet 92 of accumulator 40. In another loading-down-time accumulation mode, accumulator 44 takes-up the conveyor, and accumulator 46 pays-out the conveyor, and conveyor movement is stopped at at least second loading station 14 and at outlet 94 of accumulator 40 and at inlet 96 of accumulator 46. In a further loading-down-time accumulation mode, accumulator 44 takes-up the conveyor, accumulator 46 pays-out the conveyor, and conveyor movement is stopped at loading station 14 and at outlet 94 of accumulator 40 and at inlet 96 of accumulator 46 and at loading station 12 and at outlet 90 of accumulator 38 and at inlet 92 of accumulator 40. The noted first through fourth accumulators, including the noted second accumulator 40 in series between first and second loading stations 12 and 14, enable first and second conveyor velocities through each of the first and second loading stations, the first conveyor velocity providing the noted loading velocity during which food product is loaded on the conveyor, the second conveyor velocity providing the noted bypass velocity during which food product is not loaded on the conveyor. System 10 has the noted first mode wherein food product is loaded on the conveyor at first loading station 12 while the conveyor is moving at the noted loading velocity to provide the noted first segment of the conveyor loaded with food product, and when the first segment reaches second loading station 14 the conveyor is advanced through second loading station 14 at the noted higher bypass velocity without food product loading by second loading station 14. System 10 has the noted second mode wherein the conveyor is advanced through first loading station 12 at the noted bypass velocity without food product loading by first loading station 12, to provide a second empty segment of conveyor unloaded with food product and in series with the noted first segment, and when the second segment reaches second loading station 14 the conveyor is advanced through second loading station 14 at the noted loading velocity with food product loading by second loading station 14. The conveyor as it leaves first loading station 12 has a plurality of intermittent segments comprising the first set of segments comprising the noted first segments loaded with food product, and the noted second set of empty segments comprising the second segments unloaded with food product. The second segments are spaced by respective first segments therebetween. The conveyor as it leaves second loading station 14 has the noted second segments loaded with food product, in addition to the noted first segments loaded with food product. System 10 has a third mode wherein conveyor movement at first loading station 12 is stopped, while conveyor movement continues to inlet 70 of processing station 68 and from outlet 74 of processing station 68. System 10 has a fourth mode wherein conveyor movement at second loading station 14 is stopped, while conveyor movement continues to inlet 70 of processing station 68 and from outlet 74 of processing station 68. Conveyor 28 has the noted transport velocity at outlet 72 of accumulator 46 and at inlet 70 of processing station 68 and at outlet 74 of processing station 68 and at inlet 76 of accumulator 44. The transport velocity remains constant and the same during each of the noted four modes of system 10. The transport velocity remains constant and the same during both of the noted loading and bypass velocities of the conveyor at the loading stations 12, 14, and also remains constant and the same during the noted stopped movement of the conveyor at the loading stations 12, 14. As above noted, the transport velocity is less than the bypass velocity and greater than the loading velocity. The loading/bypass/accumulation section is subject to the demands of the conveyor in the thermal processing station 68, which can override the loading/bypass/accumulation in order to maintain constant and uniform conveyor speed through thermal processing station 68. First and second loading stations 12 and 14 can simultaneously load food product on a single conveyor 28.

It is recognized that various equivalents, alternatives, and modifications are possible within the scope of the appended claims.

What is claimed is:

1. A processing system for processing a food product comprising first and second loading stations, a conveyor traversing serially through said first and second loading stations, a first buffer having first and second accumulators, a second buffer having third and fourth accumulators, said first and second buffers arranged such that said conveyor traverses serially through said third accumulator then through said first accumulator then through said first loading station then through said second accumulator then through said second loading station then through said fourth accumulator, each of said accumulators having an inlet and an outlet and enabling differential conveyor velocity at its respective said inlet and outlet.

2. The processing system according to claim 1 comprising a processing station having an inlet receiving said conveyor from said outlet of said fourth accumulator and having an outlet returning said conveyor to said inlet of said third accumulator, and wherein said system has a loading-down-time accumulation mode wherein at least one of said first and third accumulators takes-up said conveyor and at least one of said second and fourth accumulators pays-out said conveyor such that conveyor movement to said inlet of said processing station and from said outlet of said processing station continues, while conveyor movement at at least one of said loading stations is stopped.

3. The processing system according to claim 2 wherein in said loading-down-time accumulation mode, said first accumulator takes-up said conveyor, and said second accumulator pays-out said conveyor, and conveyor movement is stopped at said first loading station and at said outlet of said first accumulator and at said inlet of said second accumulator.

4. The processing system according to claim 2 wherein in said loading-down-time accumulation mode, said third accumulator takes-up said conveyor, said fourth accumulator pays-out said conveyor, and conveyor movement is stopped at at least said second loading station and at said outlet of said second accumulator and at said inlet of said fourth accumulator.

5. The processing system according to claim 4 wherein in said loading-down-time accumulation mode, conveyor movement is also stopped at said first loading station and at said outlet of said first accumulator and at said inlet of said second accumulator.

6. The processing system according to claim 1 wherein:
said first buffer has first and second buffer modes:
said first and second accumulators move in unison in said first buffer mode, with said first accumulator taking-up said conveyor, and said second accumulator paying-out said conveyor;
said first and second accumulators move in unison in said second buffer mode, with said first accumulator paying-out said conveyor, and said second accumulator taking-up said conveyor;
said second buffer has third and fourth buffer modes;
said third and fourth accumulators move in unison in said third buffer mode, with said third accumulator taking-up said conveyor, and said fourth accumulator paying-out said conveyor;
said third and fourth accumulators move in unison in said fourth buffer mode, with said third accumulator paying-out said conveyor, and said fourth accumulator taking-up said conveyor.

7. The processing system according to claim 1 wherein said first through fourth accumulators, including said second accumulator in series between said first and second loading stations, enable first and second conveyor velocities through each of said first and second loading stations, said first conveyor velocity providing a loading velocity during which said food product is loaded on said conveyor, said second conveyor velocity providing a bypass velocity during which said food product is not loaded on said conveyor, said bypass velocity being greater than said loading velocity.

8. The processing system according to claim 7 wherein:
said system has a first mode wherein food product is loaded on said conveyor at said first loading station while said conveyor is moving at said loading velocity, to provide a first segment of said conveyor loaded with food product, and when said first segment reaches said second loading station said conveyor is advanced through said second loading station at said bypass velocity without food product loading by said second loading station;
said system has a second mode wherein said conveyor is advanced through said first loading station at said bypass velocity without food product loading by said first loading station, to provide a second empty segment of said conveyor unloaded with food product and in series with said first segment, and when said second segment reaches said second loading station said conveyor is advanced through said second loading station at said loading velocity with food product loading by said second loading station;
such that said conveyor as it leaves said first loading station has a plurality of intermittent segments comprising a first set of segments comprising said first segments loaded with food product and a second set of empty segments comprising said second segments unloaded with food product, said second segments being spaced by respective said first segments therebetween; and
such that said conveyor as it leaves said second loading station has said second segments loaded with food product, in addition to said first segments loaded with food product.

9. The processing system according to claim 7 comprising a processing station having an inlet receiving said conveyor from said outlet of said fourth accumulator and having an outlet returning said conveyor to said inlet of said third accumulator, wherein said conveyor has a transport velocity at said outlet of said fourth accumulator and at said inlet of said processing station and at said outlet of said processing station and at said inlet of said third accumulator, wherein said transport velocity remains constant during both of said loading and bypass velocities of said conveyor at said loading stations.

10. The processing system according to claim 1 comprising a processing station having an inlet receiving said conveyor from said outlet of said fourth accumulator and having an outlet returning said conveyor to said inlet of said third accumulator, and wherein said system has a loading-down-time accumulation mode wherein at least one of said first and third accumulators takes-up said conveyor and at least one of said second and fourth accumulators pays-out said conveyor such that conveyor movement to said inlet of said processing station and from said outlet of said processing station continues, while conveyor movement at at least one of said loading stations is stopped, wherein said first through fourth accumulators, including said second accumulator in series between said first and second loading stations, enable first and second conveyor velocities through each of said first and second loading stations, said first conveyor velocity providing a loading velocity during which said food product is loaded on said conveyor, said second conveyor velocity providing a bypass velocity during which said food product is not loaded on said conveyor, said bypass velocity being greater than said loading velocity.

11. The processing system according to claim 10 wherein:
said system has a first mode wherein food product is loaded on said conveyor at said first loading station while said conveyor is moving at said loading velocity, to provide a first segment of said conveyor loaded with food product, and when said first segment reaches said second loading station said conveyor is advanced through said second loading station at said bypass velocity without food product loading by said second loading station;
said system has a second mode wherein said conveyor is advanced through said first loading station at said bypass velocity without food product loading by said first loading station, to provide a second empty segment of said conveyor unloaded with food product and in series with said first segment, and when said second segment reaches said second loading station said conveyor is advanced through said second loading station at said loading velocity with food product loading by said second loading station;
such that said conveyor as it leaves said first loading station has a plurality of intermittent segments comprising a first set of segments comprising said first segments loaded with food product and a second set of empty segments comprising said second segments unloaded with food product, said second segments being spaced by respective said first segments therebetween; and
such that said conveyor as it leaves said second loading station has said second segments loaded with food product, in addition to said first segments loaded with food product;
said system has a third mode wherein conveyor movement at said first loading station is stopped while conveyor movement continues to said inlet of said processing station and from said outlet of said processing station; and said system has a fourth mode wherein conveyor movement at said second loading station is stopped while conveyor movement continues to said inlet of said processing station and from said outlet of said processing station.

12. The processing system according to claim 11 wherein said conveyor has a transport velocity at said outlet of said fourth accumulator and at said inlet of said processing station and at said outlet of said processing station and at said inlet of said third accumulator, wherein said transport velocity remains constant and the same during each of said four modes of said system.

13. The processing system according to claim 10 wherein said conveyor has a transport velocity at said outlet of said fourth accumulator and at said inlet of said processing station and at said outlet of processing station and at said inlet of said third accumulator, wherein said transport velocity remains constant and the same during both of said loading and bypass velocities of said conveyor at said loading stations and also remains constant and the same during said stopped movement of said conveyor at said loading stations.

14. The processing system according to claim 1 wherein said first through fourth accumulators, including said second accumulator in series between said first and second loading stations, enable first and second conveyor velocities through each of said first and second loading stations, said first conveyor velocity providing a loading velocity during which said food product is loaded on said conveyor, said second conveyor velocity providing a bypass velocity during which said food product is not loaded on said conveyor, and comprising a processing station having an inlet receiving said conveyor from said outlet of said fourth accumulator and having an outlet returning said conveyor to said inlet of said third accumulator, wherein said conveyor has a transport velocity at said outlet of said fourth accumulator and at said inlet of said processing station and at said outlet of said processing station and at said inlet of said third accumulator, wherein said transport velocity is less than said bypass velocity and greater than said loading velocity.

15. A processing system for processing an elongated strand of food product in a casing having tubular segments serially joined by pinched connection segments, comprising first and second strand loading stations adjacent respective first and second discharge stations of respective first and second strand producing machines, a conveyor comprising a chain traversing around first and second sprockets at respective said first and second strand loading stations, a plurality of J-shaped hooks mounted to said chain for receiving said strand of food product at a respective said strand loading station, said chain traversing serially through said first and second strand loading stations, a first buffer having first and second accumulators, a second buffer having third and fourth accumulators, said first and second buffers arranged such that said chain traverses serially through said third accumulator then through said first accumulator then around said first sprocket through said first strand loading station then through said second accumulator then around said second sprocket through said second strand loading station then through said fourth accumulator, each of said accumulators having an inlet and an outlet and enabling differential chain velocity at its respective said inlet and outlet.

16. The processing system according to claim 15 wherein:
said first accumulator comprises a first set of fixed sprockets, and a second set of moveable sprockets moveable toward and away from said first set of fixed sprockets;

said second accumulator comprises a second set of fixed sprockets, and a second set of moveable sprockets moveable toward and away from said second set of fixed sprockets;

said third accumulator comprises a third set of fixed sprockets, and a third set of moveable sprockets moveable toward and away from said third set of fixed sprockets;

said fourth accumulator comprises a fourth set of fixed sprockets, and a fourth set of moveable sprockets moveable toward and away from said fourth set of fixed sprockets;

said first and second sets of moveable sprockets are linked and move in unison such that said first set of moveable sprockets move away from said first set of fixed sprockets when said second set of moveable sprockets move toward said second set of fixed sprockets, and said first set of moveable sprockets move toward said first set of fixed sprockets when said second set of moveable sprockets move away from said second set of fixed sprockets;

said third and fourth sets of moveable sprockets are linked and move in unison such that said third set of moveable sprockets move away from said third set of fixed sprockets when said fourth set of moveable sprockets move toward said fourth set of fixed sprockets, and said third set of moveable sprockets move toward said third set of fixed sprockets when said fourth set of moveable sprockets move away from said fourth set of fixed sprockets;

said first buffer has first and second buffer modes;

said first and second accumulators move in unison in said first buffer mode, with said first set of moveable sprockets moving away from said first set of fixed sprockets and taking-up chain, and said second set of moveable sprockets moving toward said second set of fixed sprockets and paying-out chain;

said first and second accumulators move in unison in said second buffer mode, with said first set of moveable sprockets moving toward said first set of fixed sprockets and paying-out chain, and said second set of moveable sprockets moving away from said second set of fixed sprockets and taking-up chain;

said second buffer has third and fourth buffer modes;

said third and fourth accumulators move in unison in said third buffer mode, with said third set of moveable sprockets moving away from said third set of fixed sprockets and taking-up chain, and said fourth set of moveable sprockets moving toward said fourth set of fixed sprockets and paying-out chain; and said third and fourth accumulators move in unison in said fourth buffer mode, with said third set of moveable sprockets moving toward said third set of fixed sprockets and paying-out chain, and said fourth set of moveable sprockets moving away from said fourth set of fixed sprockets and taking-up chain.

17. The processing system according to claim 15 comprising a processing station having an inlet receiving said chain from said outlet of said fourth accumulator and having an outlet returning said chain to said inlet of said third accumulator, and wherein said system has a loading-down-time accumulation mode wherein at least one of said first and third accumulators takes-up chain and at least one of said second and fourth accumulators pays-out chain such that chain movement to said inlet of said processing station and from said outlet of said processing station continues, while chain movement at at least one of said loading stations is stopped.

18. The processing system according to claim 15 wherein said first through fourth accumulators, including said second accumulator in series between said first and second strand loading stations, enable first and second chain velocities through each of said first and second strand loading stations, said first chain velocity providing a loading chain velocity during which said food product is loaded on said chain, said second chain velocity providing a bypass chain velocity during which said food product is not loaded on said chain, said bypass chain velocity being greater than said loading chain velocity.

19. The processing system according to claim 15 comprising a processing station having an inlet receiving said chain from said outlet of said fourth accumulator and having an outlet returning said chain to said inlet of said third accumulator, and wherein said system has a loading-down-time accumulation mode wherein at least one of said first and third accumulators takes-up chain and at least one of said second and fourth accumulators pays-out chain such that chain movement to said inlet of said processing station and from said outlet of said processing station continues, while chain movement at at least one of said loading stations is stopped, wherein said first through fourth accumulators, including said second accumulator in series between said first and second loading stations, enable first and second chain velocities through each of said first and second strand loading stations, said first chain velocity providing a loading chain velocity during which said food product is loaded on said chain, said second chain velocity providing a bypass chain velocity during which said food product is not loaded on said chain, said bypass chain velocity being greater than said loading chain velocity, wherein:

said system has a first mode wherein food product is loaded on said chain at said first strand loading station while said chain is moving at said loading chain velocity, to provide a first segment of said chain loaded with food product, and when said first segment reaches said second strand loading station said chain is advanced through said second strand loading station at said bypass chain velocity without food product loading by said second strand loading station;

said system has a second mode wherein said chain is advanced through said first strand loading station at said bypass chain velocity without food product loading by said first strand loading station, to provide a second empty segment of said chain unloaded with food product and in series with said first segment, and when said second segment reaches said second strand loading station said chain is advanced through said second strand loading station at said loading chain velocity with food product loading by said second strand loading station;

such that said chain as it leaves said first strand loading station has a plurality of intermittent segments comprising a first set of segments comprising said first segments loaded with food product and a second set of empty segments comprising said second segments unloaded with food product, said second segments being spaced by respective said first segments therebetween; and such that said chain as it leaves said second strand loading station has said second segments loaded with food product, in addition to said first segments loaded with food product.

20. The processing system according to claim 19 wherein said chain has a transport chain velocity at said outlet of said fourth accumulator and at said inlet of said processing station and at said outlet of said processing station and at said inlet of said third accumulator, wherein said transport chain velocity remains constant and the same during each of said first and second modes of said system, including said loading and bypass chain velocities, and also remains constant and the same during said stopped chain movement at said loading stations.

21. The processing system according to claim 20 wherein said transport chain velocity is less than said bypass chain velocity and greater than said loading chain velocity.

22. A system for processing a food product comprising a loading station, a conveyor comprising a chain traversing in a horizontal plane around a sprocket at said loading station, said sprocket rotating about a vertical axis, a plurality of hooks pivotally mounted to said chain, each hook having a first orientation depending downwardly from said chain, and a second upwardly pivoted orientation for loading food product thereon, said system having a loading mode at said loading station loading food product onto said hooks, said system having a bypass mode leaving said hooks empty at said loading station without loading food product thereon, said chain moving at a loading chain velocity during said loading mode, said chain moving at a bypass chain velocity during said bypass mode, said bypass chain velocity being greater than said loading chain velocity, a retractable cam at said loading station and extendable and retractable between an extended loading position and a retracted bypass position, respectively, said cam in said extended loading position camming said hooks from said first orientation to said second orientation, said cam in said retracted bypass position leaving said hooks in said first orientation to allow said hooks to move through said loading station without being cammed to said second orientation and permitting said hooks to move through said loading station in said first orientation at said bypass chain velocity.

23. The system according to claim 22 wherein said cam is horizontally movable along a track beneath said sprocket.

24. The system according to claim 22 wherein said food product is an elongated strand of food product in a casing having tubular segments serially joined by pinched connection segments, and comprising first and second said loading stations comprising first and second strand loading stations adjacent respective first and second discharge stations of respective first and second strand producing machines, and comprising first and second said sprockets at respective said first and second strand loading stations, said plurality of hooks comprising a plurality of J-shaped hooks pivotally mounted to said chain, a first buffer having first and second accumulators, a second buffer having third and fourth accumulators, said first and second buffers arranged such that said chain traverses serially through said third accumulator then through said first accumulator then around said first sprocket through said first strand loading station then through said second accumulator then around said second sprocket through said second strand loading station then through said fourth accumulator, each of said accumulators having an inlet and an outlet and enabling differential chain velocity at its respective said inlet and outlet, and comprising first and second said retractable cams at respective said first and second strand loading stations, said first through fourth accumulators, including said second accumulator in series between said first and second strand loading stations, enabling first and second chain velocities through each of said first and second strand loading stations, said first chain velocity providing said loading chain velocity during which said food product is loaded on said chain at said J-shaped hooks, said second chain velocity providing said bypass chain velocity during which said food product is not loaded on said J-shaped hooks, said bypass chain velocity being greater than said loading chain velocity, wherein:

said system has a first mode wherein food product is loaded on said J-shaped hooks at said first strand loading station while said chain is moving at said loading chain velocity and said first cam is in said extended loading position, to provide a first segment of said chain loaded with food product on said J-shaped hooks, and when said first segment reaches said second strand loading station said chain is advanced through said second strand loading station at said bypass chain velocity with said second cam in said retracted bypass position without food product loading by said second strand loading station;

said system has a second mode wherein said chain is advanced through said first strand loading station at said bypass chain velocity with said first cam in said retracted bypass position without food product loading by said first strand loading station, to provide a second empty segment of said chain unloaded with food product and in series with said first segment, and when said second segment reaches said second strand loading station said chain is advanced through said second strand loading station at said loading chain velocity with said second cam in said extended loading position with food product loading by said second strand loading station on said J-shaped hooks;

such that said chain as it leaves said first strand loading station has a plurality of intermittent segments comprising a first set of segments comprising said first segments loaded with food product and a second set of empty segments comprising said second segments unloaded with food product, said second segments being spaced by respective said first segments therebetween; and such that said chain as it leaves said second strand loading station has said second segments loaded with food product, in addition to said first segments loaded with food product.

* * * * *